Figure 1:
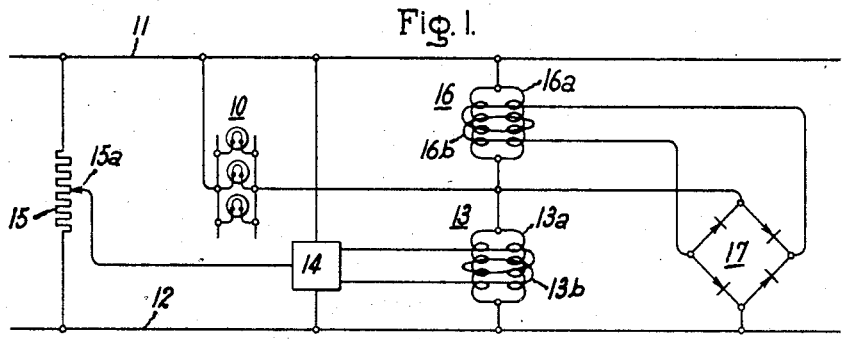

Dec. 23, 1941.  D. E. CHAMBERS  2,267,395
CONTROL SYSTEM
Filed May 11, 1940

Inventor:
Dudley E. Chambers,
by Harry E. Dunham
His Attorney.

Patented Dec. 23, 1941

2,267,395

UNITED STATES PATENT OFFICE 2,267,395

CONTROL SYSTEM

Dudley E. Chambers, Scotia, N. Y., assignor to General Electric Company, a corporation of New York Application May 11, 1940, Serial No. 334,599

6 Claims. (Cl. 171—119)

This invention relates to control systems, more particularly to control systems in which a variable voltage drop device such as a variable resistor or reactor is connected in series with a load or translating device and is varied to vary the supply of energy to such load or translating device.

One of the difficulties in control systems of this character is the reduction of the load current to a low value when the resistance of the load is high. The reason for this difficulty is that as the resistance of the load increases the voltage drop across the load becomes such an appreciable portion of the total voltage drop across the load and series connected variable voltage drop device that the current through the load will not be reduced to the desired low value even when the series connected variable voltage drop device is adjusted for maximum impedance.

This is illustrated by a theater dimming control system in which a dimming device such as a variable reactor or resistor is connected in series with the lamp load and is varied to vary the intensity of illumination of the lamps. One of the problems of such a dimming control system is to obtain a substantial "blackout" of the lamps when the lamp load is a relatively small one. Since the resistance of the lamp load increases as the number of parallel connected lamps decreases, the voltage drop across a relatively small lamp load is an appreciable percentage of the total voltage drop across the lamp load and series connected dimming device and consequently the lamp load is not blacked out even when the dimming device is adjusted for maximum impedance.

At the present time saturable core type reactors are widely used for dimming lamp loads. Such reactors when well designed from the point of view of economy are capable of dimming all loads between full load and quarter load to a satisfactory blackout. However, wider load variations are desirable. It is possible to obtain satisfactory dimming of a wider variation of loads by designing the reactor so that its exciting current is reduced. But inasmuch as the saturable reactor size increases rapidly as its exciting current is reduced, the cost becomes prohibitive.

Accordingly, a further object of the invention is the provision of a control system in which inexpensive means may be employed to reduce the current supplied to very small loads, i. e., loads very substantially less than 25% of full load of the series connected reactor, to a very low value.

In carrying the invention into effect in one form thereof, a variable impedance device is connected in series relationship with a load or electrical translating device to a source, and means are provided for varying this impedance device to vary the current supplied to the load together with means controlled by the variable impedance device for effectively shunting the load when the voltage drop across the impedance device is maximum thereby to reduce the current supplied to relatively small loads to a relatively low value.

Figure 2:
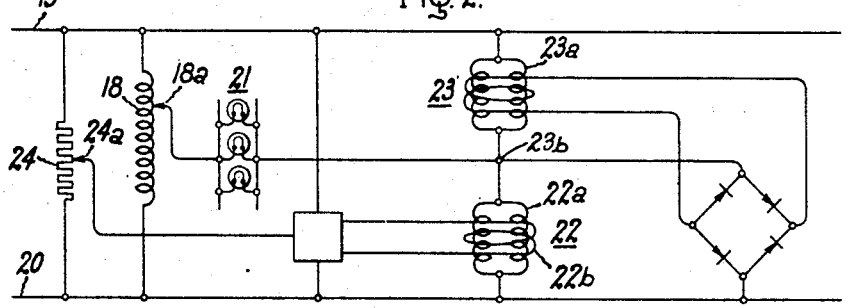
Figure 3:
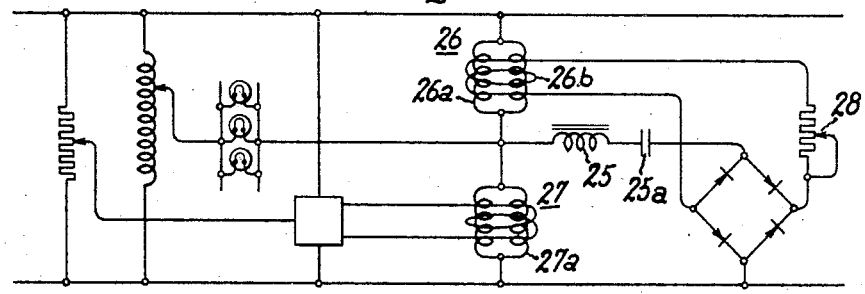
Figure 4:
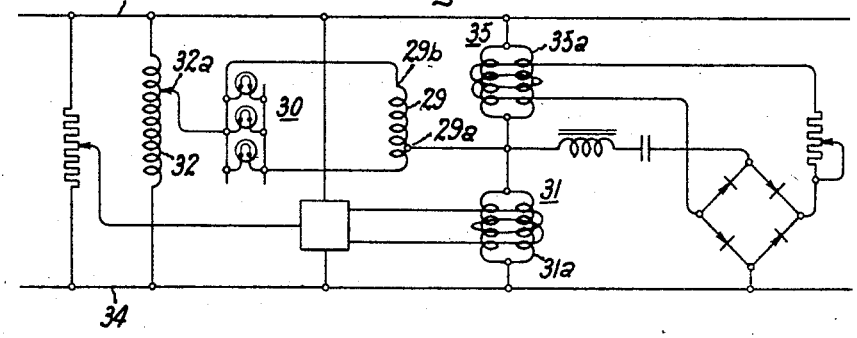

For a better and more complete understanding of the invention, reference should now be had to the following specification and to the accompanying drawing in which Fig. 1 is a simple, diagrammatical sketch of an illumination control system illustrating an embodiment of the invention, and Figs. 2, 3, and 4 are modifications.

Referring now to the drawing, a lamp load 10 is connected to a suitable source of supply such as the source of alternating current represented by the two supply lines 11 and 12. A suitable variable impedance device which is illustrated as a saturable core reactor 13 having an alternating current reactance winding 13a and a direct current saturating winding 13b is provided for dimming the lamp load 10. These windings are suitably arranged on the legs of an iron core (not shown). When the core is unexcited, i. e., when the direct current in the direct current winding is zero, the reactance of the alternating current winding 13a is maximum. Under this condition the reactive voltage drop across the alternating current winding is also maximum. Conversely, when the direct current in the direct current winding is maximum, i. e., when the core is saturated by the direct current flux, the reactance and the reactive voltage drop of the reactance winding are minimum.

Direct current is supplied to the direct current winding 13b from an electric valve circuit unit represented conventionally by the rectangle 14. Although any suitable electric valve circuit may be used, it is preferred to employ the valve circuit disclosed in United States Patent No. 1,904,485—Livingston. The current supplied by the electric valve unit 14 may be suitably controlled by means of the potentiometer 15 and its movable contact 15a. By varying the position of contact 15a on the potentiometer 15, the current supplied to the direct current winding 13b can be varied from zero to maximum and as a result the reactive voltage drop across the reactance winding 13a is varied inversely as explained in the foregoing. Since the lamp load 10 and the reactive winding 13a are connected in series across the source 11, 12, the voltage across the lamp load will be the difference between the constant voltage of the source and reactive voltage drop of winding 13a. It may be assumed that when the movable contact 15a is at the upper end of the potentiometer and has the voltage of line 11, the intensity of illumination of the lamp load is maximum and that when the movable contact is at the lower end of the potentiometer, the intensity of illumination is minimum.

When the sliding contact 15a is at the lower end of the potentiometer, it is desired that the lamp load shall be blacked out. It may be assumed that the design of reactor 13 is such that when no direct current is flowing in the direct current winding, approximately six per cent exciting current will be flowing in the reactance winding 13b. Such a reactor will dim a load between one-fourth and full load to a satisfactory blackout. However, when the load is decreased below one-fourth load, the reactive voltage drop across the reactance winding 13a decreases below the value necessary to produce satisfactory blackout of the lamp load.

In order to overcome this difficulty, the reactance winding 16a of a ballasting saturable core reactor is connected in parallel with the lamp load 10 and its direct current saturating winding 16b is excited by a direct current voltage derived through a copper oxide rectifier 17 from the voltages existing across the reactance winding 13b of the dimming reactor.

In operation, when the movable contact 15a is at the upper terminal of resistor 15, the reactive voltage drop across reactance windings 13a of the dimming reactor will be minimum and the intensity of illumination of the lamp load will be maximum. As a result of the small voltage drop across reactance windings 13b, the direct current supplied to the saturating winding 16b of the ballasting reactor will be correspondingly small and the reactive voltage drop across the reactance winding 16a is correspondingly high and has no appreciable effect on the intensity of illumination of the lamp load. Movement of the movable contact 15a along the resistor 15 toward the lower end increases the reactive voltage drop across reactance windings 13a and this results in increasing the direct current in the saturating winding 16a of the ballasting reactor and in reducing the reactance and reactive voltage drop of its reactance winding.

When the movable contact is at the lower end of resistor 15, the reactive voltage drop across reactance winding 13a is maximum, but in the case of a lamp load of less than one-fourth rated load of reactor 13 it is insufficient to dim the lamp load to blackout. However, at this time the saturation of the ballasting reactor 16 is maximum and the reactive voltage drop across its reactance winding 16a is minimum. Thus, reactor 16 becomes in effect a low resistance shunt for the lamp load 10, which by-passes current around the lamp load 10 and thereby effects satisfactory blackout of the lamp load.

There is of course a minimum voltage drop across the reactance winding 16a of the ballasting reactor, and consequently the system shown in Fig. 1 will not reduce the voltage across the lamp load to zero. If still lower voltage across the lamp load is essential or desirable, the system shown in the modification of Fig. 2 may be utilized. In this modification an autotransformer 18 is connected across the supply source 19, 20, and the lamp load 21 is connected between the upper terminal of the reactance winding 22a of the dimming reactor 22 and the tap 18a of the autotransformer. The remainder of the system of this modification is identical with the system of Fig. 1. The position of tap 18a can be adjusted until the voltage drop between the tap 18a and junction 23b is minimum.

In the system of Fig. 2, the current through the reactance winding 23a first increases rapidly to a high peak value as the movable contact 24a is moved upwardly to increase the control voltage supplied to the direct current winding 22b of the dimming reactor and then decreases rapidly. This is caused by the too rapid decrease of impedance of the ballasting reactor as the voltage drop across the reactance winding 22a of the dimming reactor is increased. This is overcome in the modified system shown in Fig. 3 by adding a series resonant non-linear circuit comprising a reactor 25 and a capacitor 25a so as to control the rectified power supplied to the saturating winding 26a of the ballasting reactor 26. The addition of the series resonant non-linear circuit tends to prevent current flow to the saturating winding 26b of the ballasting reactor until the voltage drop across the reactance winding 27a of the dimming reactor 27 has been increased to a predetermined value which is adjustable by the adjustable resistor 28. The modification of Fig. 3 is in all other respects identical with the system of Fig. 2.

In the modification of Figs. 1, 2, and 3, no provision is made for compensating for the minimum voltage drop of the dimming reactors 13, 22, and 27. These reactors are usually designed to have a relatively high minimum voltage drop and consequently when the movable contact member 24a is moved to the upper end of resistor 24 (Fig. 2) to produce maximum intensity of illumination of the lamp load 21, the actual voltage applied to the lamp load is less than line voltage by the amount of the minimum voltage drop across the reactance winding 22a and the voltage drop in the portion of the autotransformer winding 18 between the movable contact 18a and the side 19 of the source. In the modification of Fig. 4 these voltage drops are compensated by means of an autotransformer 29 whose winding is connected across the lamp load 30 and is included in the connections between the lamp load 30 and the reactance winding 31a of the dimming reactor 31 through the tap 29a. The position of tap 29a can be adjusted to compensate for the minimum voltage drop across reactance winding 31a and also the voltage drop across the portion of autotransformer winding 32 between the tap 32a and the upper side of the source represented by supply lines 33 and 34. The boosting action of autotransformer 29 is negligible at minimum lamp voltage when the voltage drop across reactance winding 35a of ballasting reactor and the voltage drop across the portion of autotransformer winding 32 between tap 32a and side 33 of the source are adjusted to apply minimum voltage to transformer terminals 29a and 29b.

Although in accordance with the provisions of the patent statutes, this invention is described as embodied in concrete form and the principle of the invention has been explained together with the best mode in which it is now contemplated applying that principle, it will be understood that the elements and connections shown are merely illustrative and that the invention is not limited thereto, since alterations and modifications will readily suggest themselves to persons skilled in the art without departing from the true spirit of the invention or from the scope of the annexed claims.

What I claim as new and desire to secure by Letters Patent of the United States, is:

1. A control system comprising a source of alternating current, a load, a variable reactance device connected in series with said load across said source, means for varying the reactance of said device to vary the current supplied to said load, means for shunting said load to bypass about said load a substantial portion of the current flowing through said reactance device when said load is relatively small comprising a saturable core reactor having a reactance winding connected in parallel with said load and a direct current saturating winding and a rectifier connected across said variable reactance device for supplying direct current to said saturating winding.

2. A control system comprising in combination, a source of alternating current, a load, means for varying the current supplied to said load comprising a saturable core reactor having a reactance winding connected in series with said load across said source and a direct current saturating winding and means for supplying a variable direct current to said saturating winding, a rectifier connected across said reactance winding for producing a direct current voltage proportional to the voltage across said reactance winding, and means for shunting said load to bypass about said load a substantial portion of the current flowing through said reactance winding when said load is relatively small comprising a second saturable core type reactor having a reactance winding connected in shunt with said load and a direct current saturating winding supplied from said rectifier.

3. A control system comprising in combination, a source of alternating current, an autotransformer having its winding connected across said source, a load, a variable impedance device connected in series relationship with said load from one side of said source to an intermediate point of said autotransformer, and means controlled by said impedance device for shunting said load to bypass about said load a substantial portion of the current flowing through said impedance device when said load is relatively small, said autotransformer being adjustable to compensate for the minimum voltage drop of said shunting means.

4. A control system comprising in combination, a source of alternating voltage, a load, a variable reactance device connected in series with said load to said source, means for varying the reactance of said reactance device thereby to vary the current supplied to said load, means for bypassing about said load a substantial portion of the current flowing through said reactance device comprising a saturable core type reactor having its reactance winding connected in a parallel circuit with said load, a direct current saturating winding and a rectifier connected across said variable reactance device for supplying variable direct current to said saturating winding so that the impedance of said parallel winding is reduced to a low value when the impedance of said variable reactance device is high, and an autotransformer included in the connections between said load and source for compensating for the minimum voltage drop of the reactance winding of said saturable core type reactor.

5. A control system comprising in combination, a source of alternating voltage, a load, a variable impedance device connected in series relationship with said load to said source, means for varying the impedance of said device between maximum and minimum values thereby to vary the current supplied to said load, means controlled by said impedance device for shunting said load to bypass about said load a substantial portion of the current flowing through said impedance device when the impedance of said impedance device is maximum, a first autotransformer connected across said source and having a portion of its winding included in the connections between said load and said source to compensate for the minimum voltage drop of said shunting means so as to minimize the voltage across said load when the impedance of said impedance device is maximum, and a second autotransformer having its winding connected in parallel with said load and having a portion of its winding included in the connections between said variable impedance device and said load to compensate for the voltage drop of said impedance device when its impedance is minimum thereby to provide for applying full line voltage to said load.

6. A control system comprising in combination, a source of alternating voltage, an autotransformer, a lamp load connected across the winding of said transformer, a variable reactance device connected in series relationship with a portion of said transformer winding to said source, means for varying the reactance of said reactance device between a minimum value and a maximum value to vary the current supplied to said load, means for shunting said load comprising a saturable core reactor having a reactance winding connected in a parallel circuit with said load, a direct current saturating winding and a rectifier connected across said variable reactance device for supplying direct current to said saturating winding thereby to bypass about said load a substantial portion of the current flowing through said reactance device when the reactance of said variable reactance device is maximum, a second autotransformer included in the connections between said load and source for compensating for the minimum voltage drop of the reactance winding of said saturable core reactor when the reactance of said variable reactance device is maximum, said first autotransformer serving to compensate for the minimum voltage drop of said variable reactance device thereby to provide for applying full line voltage to said lamp load when the reactance of said variable reactance device is minimum.

DUDLEY E. CHAMBERS.